J. White, Wheel Castor.
72575

PATENTED DEC 24 1867

Witnesses:
Alex T. Roberts
J. A. Fraser

Inventor:
J. White
per Munn & Co
Attorneys

United States Patent Office.

JOSEPH WHITE, OF PROVIDENCE, RHODE ISLAND.

Letters Patent No. 72,575, dated December 24, 1867.

---

IMPROVED CASTER.

---

The Schedule referred to in these Letters Patent and making part of the same.

---

TO ALL WHOM IT MAY CONCERN:

Be it known that I, JOSEPH WHITE, of Providence, in the county of Providence, and State of Rhode Island, have invented a new and improved Wheel-Caster; and I do hereby declare that the following is a full, clear, and exact description thereof, which will enable those skilled in the art to make and use the same, reference being had to the accompanying drawings, forming part of this specification.

This invention relates to a new and improved method of constructing wheel-casters for all purposes for which such casters are used, whereby the friction between the parts is greatly diminished. It consists of a solid disk secured to the spindle, provided with a groove in the under side of the same, to receive metallic balls or their equivalents, on which the under plate to which the wheel is attached rests, whereby the supporting arms of the wheel move more freely and with less friction around the spindle. In the accompanying plate of drawings—

Figure 1:
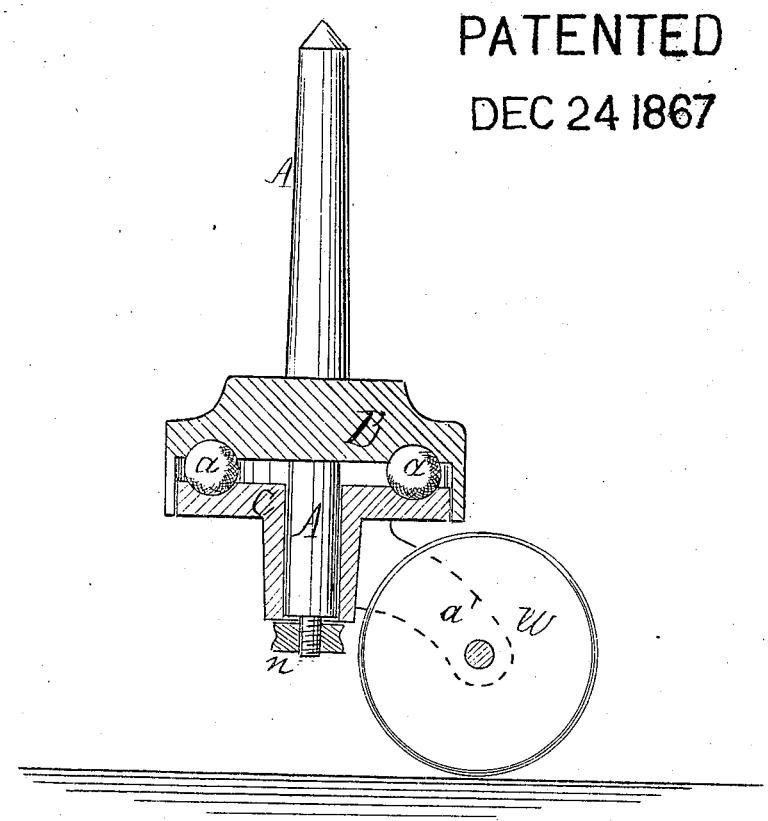
Figure 1 is a central vertical sectional view of my invention, taken in line $x$ $x$, fig. 1.
Figure 2:
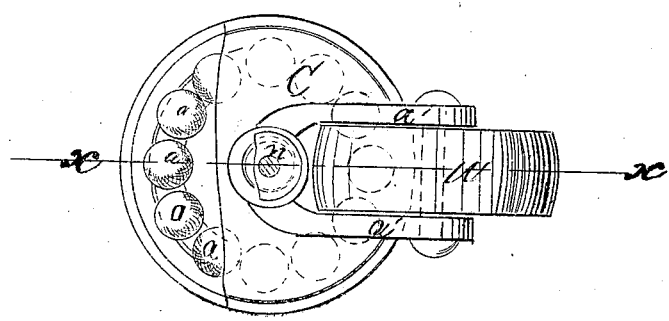
Figure 2 is an underneath view of the same, a portion of the lower plate being removed to show the construction.

A is the spindle. B is the upper circular plate or disk attached to spindle A. C is the lower circular plate rotating within the rim of plate B on the spindle A. $a'$ are arms attached to plate C, between which the wheel W rotates. $n$ is a nut on the lower end of spindle, to hold the plate C upon the spindle A. $a$ are metallic friction-balls, or their equivalent, between the plate B and the plate C, on which the plate C bears. The spindle A is made in the ordinary form, and has attached to the same, or being a part thereof, a circular plate or disk, B, provided with a rim on the under side in the form of an inverted cup. Said plate B is provided on the under side with a circular groove, to receive the balls $a$, as shown. The plate C consists of a hub and a flange, bored through in the centre, to receive the lower end of the spindle A, and on which said spindle A said plate C rotates within the rim of the plate B, as shown. Said plate C is also provided on the upper side of the same with a circular groove corresponding with the groove in plate B, to receive the balls $a$. The balls $a$ are made of iron or other suitable metal, in size from an eighth of an inch in diameter and larger, according to the size of the caster. The spindle A is provided on the lower end of the same with a screw-thread, to receive a nut, $n$, by means of which plate C is kept up against a shoulder on said spindle A, and so as just to touch the surfaces of the balls $a$. The arms $a'$ and the wheel $w$ are constructed and arranged as on casters now in common use, as shown, said arms $a'$ being rigidly secured to the hub of the plate C, as shown.

The operation is similar to that of wheel-casters now in common use, the plate C rotating upon the balls $a'$, the friction of the wheel $w$ revolving about the spindle A being by the turning of said balls $a$ greatly diminished.

It may be constructed of iron or brass, or of iron and brass combined, or of other suitable metal.

Constructed as above shown and described, it constitutes a durable and useful wheel-caster for all purposes for which casters are used, the advantages of which are that the friction between the parts when in use is greatly diminished.

I claim as new, and desire to secure by Letters Patent—

As a new article of manufacture, a furniture-caster, consisting of the grooved plates B C, spindle A, balls $a$, arms $a'$, wheel $w$, and nut $n$, all constructed, arranged, and operating as and for the purpose described.

JOSEPH WHITE.

Witnesses:
HENRY MARTIN,
JOHN C. PURKIS.